US005604988A

United States Patent [19]

Costelloe

[11] Patent Number: 5,604,988

[45] Date of Patent: Feb. 25, 1997

[54] MULTIPURPOSE DEVICE FOR MARKING OR PLACING A WORKPIECE

[76] Inventor: Paul M. Costelloe, Box 121, Stockbridge, Mass. 01262

[21] Appl. No.: 413,511

[22] Filed: Mar. 30, 1995

[51] Int. Cl.$^{6}$ ...... G01B 3/30

[52] U.S. Cl. ...... 33/501; 33/194; 33/526; 33/562; 33/567

[58] Field of Search ...... 33/1 G, 194, 197, 33/404, 411, 429, 474, 501, 520, 526, 534, 562, 567, 644, 645, 666

[56] References Cited

U.S. PATENT DOCUMENTS

| | | | |
|---|---|---|---|
| 313,197 | 3/1885 | Gaylord | 33/562 |
| 1,575,254 | 3/1926 | Cory | 33/194 |
| 2,642,674 | 6/1953 | Schell, Jr. . | |
| 2,764,818 | 10/1956 | Gard . | |
| 3,623,232 | 11/1971 | Mahlstadt . | |
| 3,735,497 | 5/1973 | Boettcher | 33/526 |
| 4,244,105 | 1/1981 | Goussios | 33/1 M |
| 4,513,510 | 4/1985 | Swanson | 33/419 |
| 4,837,939 | 6/1989 | Pullen | 33/562 |
| 4,930,225 | 6/1990 | Phillips | 33/526 |
| 4,955,142 | 9/1990 | Rieck | 33/526 |
| 4,989,336 | 2/1991 | Waltrip et al. | 33/526 |
| 5,109,609 | 5/1992 | Anderson | 33/567 |
| 5,123,172 | 6/1992 | Thrun | 33/194 |
| 5,325,595 | 7/1994 | Marlin | 33/526 |
| 5,349,758 | 9/1994 | Bear | 33/194 |

FOREIGN PATENT DOCUMENTS

| | | | |
|---|---|---|---|
| 108239 | 8/1943 | Sweden | 33/194 |

*Primary Examiner*—G. Bradley Bennett
*Attorney, Agent, or Firm*—Cain, Hibbard, Myers & Cook

[57] ABSTRACT

A multipurpose device for marking a workpiece which has in combination a component for setting the reveal between an edge such as trim molding and the edge of a frame, a component for setting an angle from 0° to 90°, a component for setting a space between two solid members such as deck boards or pickets in a picket fence, and a component for determining the center of a flat surface such as determining the center of the surface of a board between 2 parallel edges. Preferably the device is a three layer laminated square with the middle layer being larger in the overall dimensions i.e., length and width, which in a square, are the same dimension, are greater than corresponding dimensions of the two outer layers such that the middle layer extends beyond the edges of the outer layers.

7 Claims, 5 Drawing Sheets

MULTIPURPOSE DEVICE FOR MARKING OR PLACING A WORKPIECE

BACKGROUND OF THE INVENTION

This invention is directed to a multipurpose marking device that is a valuable aid for marking a workpiece particularly for one working with wood. It is a valuable device for carpenters, cabinet makers, remodelers, lay persons, etc. The multipurpose device of this invention is a new type of marking instrument, and the use of the device eliminates conventional marking methods and errors that can be associated with conventional marking devices used in finish and trim carpentry for doors, windows, cabinets, etc. as will be described hereinafter.

Typically, for example, when a carpenter begins to trim a door, the carpenter chooses a "set-back" or "reveal" from the door for the trim. While both terms mean the same, they indicate the set-back between the edge of the door frame and the edge of the trim molding. The function of the "set-back" or "reveal" (hereinafter referred to as "reveal") is both practical and aesthetic. From the practical side, in the case of a door for example, the reveal allows for clearance of the pin and barrel of the door hinge. For aesthetic purposes, the set-back reveals part of the door frame giving a pleasing appearance to the door opening. Generally, the reveal is 1/8", 3/16" or 1/4", but can be greater depending on the builder's desire. It is measured repeatedly around the frame by either a combination square with measuring rule and/or a level or a tape measure. As can be appreciated, this leaves considerable margin for error, mismeasurement, etc.

Conventional tools used today are combination square with measuring rule and level, mortising gauge with built-in pin that adjust lateral marking, and on-the-job hand-made molding marking tool for marking reveals. All of the above are cumbersome and prone to misadjustment. The tool made on the job is difficult to make true and can easily be misadjusted through use.

The unique marking device of this invention provides one with means for easily choosing one of several graduated reveal marking dimensions which may be, for example, 1/8", 3/16" or 1/4" or such other reveal settings for the desired marking of the frame accordingly for reveal exposure. Marking of the frame is thus quick and exact, essentially eliminating any margin of error. In addition, marking the reveal using the unique device of this invention quickly allows the user to determine the mitre-points on the marked frame. The mitre-points are the place where the bottom edge of the top piece of the trim or finish molding meets the inside edge of the side piece of the finish or trim molding.

Therefore, there is a need for a functional device for marking reveals that is simple, accurate, saves time and eliminates error, as well as having other functions which eliminate the need for a work person to carry many separate marking tools.

SUMMARY OF THE INVENTION

This invention is directed to and discloses a unique multipurpose marking device that is essentially board like, is simple to use, is accurate, is not easily misadjusted and saves time, which is valuable to a work person. The device of this invention has other functional features besides being capable of accurately marking reveals for trim molding. These features include means for accurately marking angles of 10°–90°, means for setting 90° angles such as for placing of shelves or marking a 90° angle on a work piece, means for determining the center of a flat surface such as a board for such purposes as drilling a hole, placing of hardware, etc., and means for setting a space between members such as deck boards, stair treads, pickets of a fence, baseboards to allow for carpeting, etc. When used as a spacer, the tool will not "fall through" the space as can happen when spacing deck boards using a nail or piece of wood.

For the purpose of describing the multipurpose marking device of this invention, it will be referred to as a laminated square of about four (4) inches square with respect to the largest layer thereof. However, the four (4) inch square size and following description of the device is not intended to be limiting. The laminated square has at least two (2) layers and preferably three (3) layers, but may be more than three layers or may be a one-piece unit. For convenience, and to describe the multipurpose marking device of this invention, the device will be described in terms of having three layers which shall be referred to as the top, middle and bottom layers, but only for the purpose of differentiating the layers. Using a four (4") inch device for description purposes, the middle layer is square being even on all sides, i.e. in this example, it is four (4") inches on each side and extending outward on all sides from the top and bottom layers. In relationship to the top layer, the middle layer extends 1/4 of an inch on two (2) joining sides from the top layer and 1/8 of an inch on the other two (2) joining sides from the top layer. Each 1/4" and each 1/8" extension of the middle layer extends the full length of each side, respectively. One corner of the top layer is cut away at a 45° angle so that the section removed or cut away is approximately 1" on each right angle side of the section removed, the dimension of which is not critical to the invention. Since the section removed is triangular in shape, i.e. a corner removed, the hypotonus of the triangle section is about 2" in length in this described cutaway.

The bottom layer is triangular in shape, covering less than half of the surface area of the bottom side of the middle layer. The triangular layer forms a right triangle, being approximately 3½" long on each side forming the right angle. As with the top layer, the middle layer in this case extends 3/16 of an inch beyond the two sides of the right triangle. The middle of the hypotonus of the right triangular layer has an approximately 1¼ of an inch diameter semicircular section removed which semicircular cutout provides a convenient means for gripping the device when so using it. For example, when being used as a spacer, one can place a finger in the cut out section to hold the tool or remove the tool after setting a space between two members.

In approximately the middle of the device of this invention is a hole that is approximately 1/8" in diameter but may be any size sufficient for the insertion of a lead pencil, a ball point pen, a nail or other marking means to protrude through the device from the one side to the other for marking purposes.

In addition, on the top layer, diagonally across from each other, on opposite corners of the top layer are two small protrusions or location knobs situated on a center line between the two location knobs and the hole in the device. These location knobs are generally round, about 1/8" in diameter and protrude about 1/16" to about 1/8" vertically from the top layer, i.e. perpendicular to the surface of the top layer. To find the center of a board, for example, the location knobs are placed on the board with one location knob against one edge of the board and the other location knob against the opposite parallel edge of the board. By placing a marker through the hole, one then is able to mark the center of the surface of the board on which the device is placed. While the above sets forth that these location knobs are on opposite corners of the top layer, the above-described placing of these location knobs is not critical providing the location knobs and hole are on a center line passing through the location knobs and hole.

As set forth previously, the multipurpose marking device is described in terms of a three (3) layer laminated device with three (3) reveal dimensions wherein the middle layer is a square. However, this is not intended to be limiting since the device of the invention, i.e., the middle sections, may be square, rectangular, pentagonal, hexagonal, triangular or any multi-sided section provided that the functions can be so incorporated in the device so as to provide for the marking or placing of a workpiece in accordance with this invention. Also, there may be more than three reveals. For example, the top layer may be so positioned as to provide for one or more reveals. The bottom layer, which forms a triangle, may be also so positioned as to provide for two different reveals. Thus, the device of this invention may provide from one to six or more reveals depending on the shape of the bottom or top layers. Further, while the bottom layer is described herein in terms of a right triangle in order to obtain a 45° angle, this triangular section may be so made as to provide angles other than a 45° angle such as angles of 10° to 90°. In addition, the dimensions with respect to the reveal are used for purposes of describing the device of this invention and are also not intended to be limiting. The dimensions may be varied as so desired and may be in either English or Metric units.

While the unique multipurpose marking device of this invention has been described in terms of a laminate, it may be prepared as a one-piece unit, such as a single injection molded thermoplastic resin unit or a single unit molded out of a plastic, wood or metal stock, or wherein two (2) layers of the three (3) layers are made as one such unit with the third layer laminated thereto.

The dimensions of the device for reveal of trim molding on a frame are shown as ⅛", 3⁄16" and ¼". These dimensions may be any dimension, however, depending on the particular reveal wanted for the trim molding.

Also, while the device of this invention is described in terms of having fixed or permanent measurements, such a device, as described herein and within the scope of this invention, may have adjustable settings for marking the reveal for setting of trim molding.

Further, while the device of this invention is described in terms of being a solid matrix, it may have cut out sections for ease of handling, carrying, reducing weight, etc., provided that such cut of sections do not interfere with any of the marking means of the device of this invention.

The nomenclature of top and bottom of the marking device are used merely to identify one side from the other and are not intended to indicate that the tool of this invention has a specific top and a specific bottom side with respect to the use of the multipurpose device of this invention. They are merely used for reference purposes only.

DETAILED DESCRIPTION OF THE DRAWINGS

Figure 1:
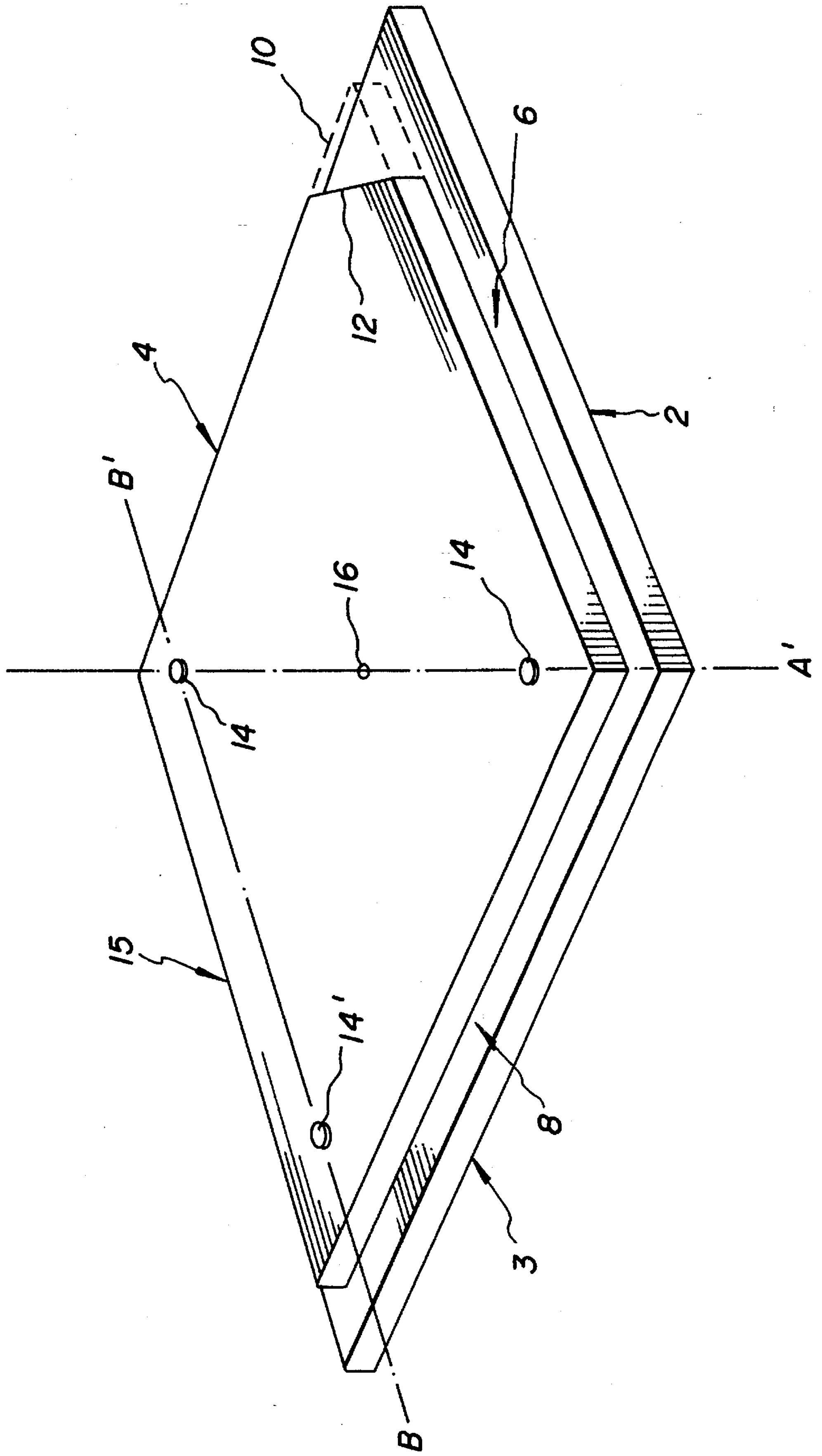
FIG. 1 is an isometric view of the top side of the unique multipurpose marking device of this invention.

In isometric FIG. 1, layer 2 is a square in which all sides are of equal dimensions. Layer 4 is also a square, but smaller in size than layer 2, but so set on layer 2 that reveal spacing 6 is wider than reveal spacing 8. For the purpose of this embodiment of the invention, reveal spacing 6 is ¼" and reveal spacing 8 is ⅛". The side opposite from the ¼" reveal spacing 6 (not visible in FIG. 1) has a ⅛" reveal spacing and the side opposite the ⅛" reveal spacing 8 (not visible on FIG. 1) has a reveal spacing. These reveal spacings are used to mark the reveal spacing of the trim molding from the edge of a frame on a door, window, etc. Once one or more markings are made, then a straight line can be drawn through the markings using, for example, a straight edge or the device can be used to mark the line by merely holding a marking instrument against the edge of the device and marking a continuous line as the device is drawn down. The leading edge of the trim molding can then be placed along the marked line revealing the desired exposure of the frame and then fastened in place. The reveal spacing can also be used to mark the mitre points on the marked frame.

Cut off section 10 is for providing a space between items such as deck boards, pickets in fences, etc. by placing edge 12 against the fastened board while placing the next board to be fastened against the device. The spacing between boards is then the thickness of layer 2. Location knobs, which are preferably round but may be square, 14 are about 1⁄16" in height and are located on a center line from one location knob to the other location knob through hole 16. By placing one knob 14 against one edge of a flat surface board and the other knob against the opposite edge of said flat surface board (shown in FIG. 6), the center of the flat surface of the board between the knobs is directly over hole 16 and can be so marked by inserting a pencil or other marker in hole 16 from the other side of the device through hole 16 to the surface of the board. This is then the center between the opposite edges of the board. It is not critical that the location knobs 14 and hole 16 are on a center line from one corner to the opposite corner of layer 4 as shown by center line A–A' in FIG. 1. It is only critical that the location knobs 14 and hole 16 be on a center line passing through location knobs 14 and hole 16.

Optionally, as shown on FIG. 1, top layer 4 may have an additional location knob 14' at one of the other corners. The additional knob is so placed that a center line B–B' between such two location knobs 14 and 14' would be parallel to an edge of the top layer 4, namely edge 15 of FIG. 1. Thus, when location knobs 14 and 14' are placed against one edge of a board or workpiece, an edge of layer 2 such as edge 3 forms a 90° angle with the edge of the board against which location knobs 14 and 14' are placed. The board can then be marked with a marking instrument.

Figure 2:
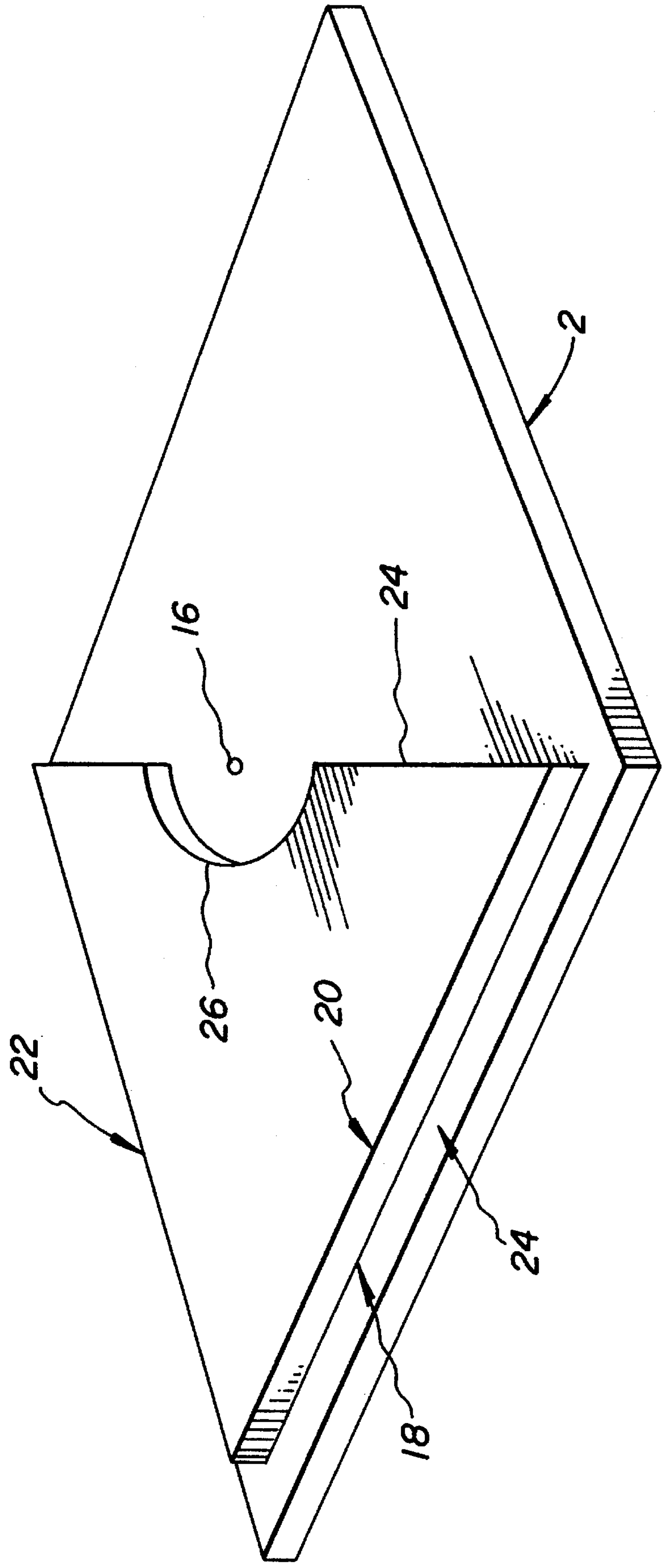
FIG. 2 is an isometric view of the bottom side of the unique multipurpose marking device of this invention.

Isometric FIG. 2 is an isometric view of the bottom or other side of the multipurpose marking device of this invention, showing the opposite side of layer 2. Sides 20 and 22 of layer 18 are of equal length. Layer 18 has reveal spacing 24 where each spacing is 3⁄16". This reveal spacing is also used for the same purpose as described previously, but have a different reveal spacing for marking the leading edge of trim molding from the edge of the frame of a door, window, etc. Thus, the multipurpose device of this invention in the one embodiment described has three different reveal spacings that can be used and are ⅛", 3/16" and ¼" respectively. The multipurpose device of this invention can also be made with different reveal spacing if so desired.

The device can be used to provide a wider spacing between boards by using the thickness of layer 2 and layer 4. By employing the opposite side, namely the side shown in FIG. 2, the spacing is the thickness of both layer 2 and 4 by placing edge 24 on fastened board and butting the next board against the device.

Semi circular cut-out section 26 is a gripping convenience such that one may place their finger or thumb in cut-out section 26 in order to hold the device in place when in use or to remove the device after spacing use.

Figure 3:
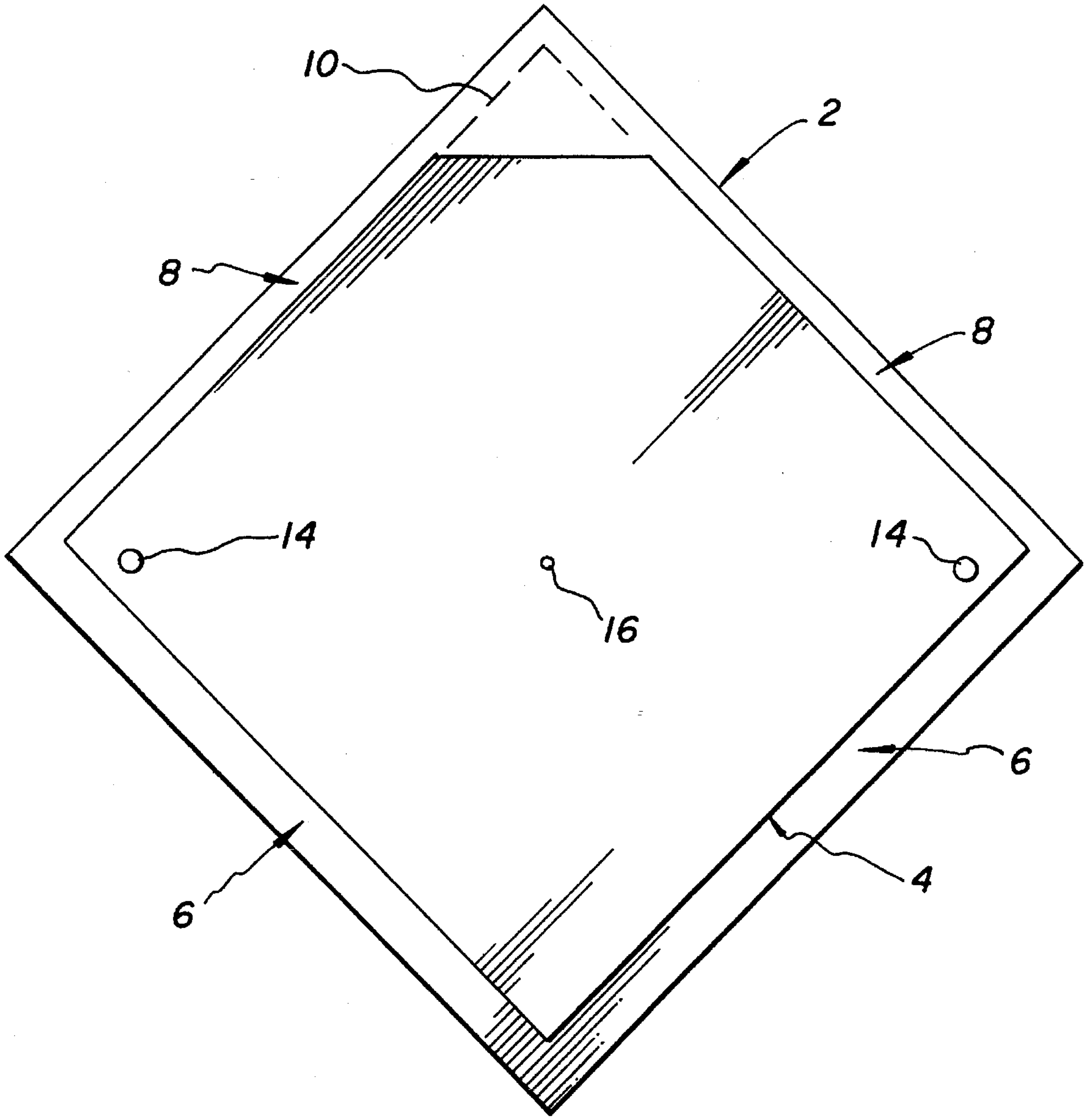
FIG. 3 is a top view of the top side of the unique multipurpose marking device of this invention.

FIG. 3 is a top view of the top side of the multipurpose device showing cut-out section 10, reveal spacing 6 and reveal spacing 8, hole 16, layer 2, layer 4 and location knobs 14.

Figure 4:
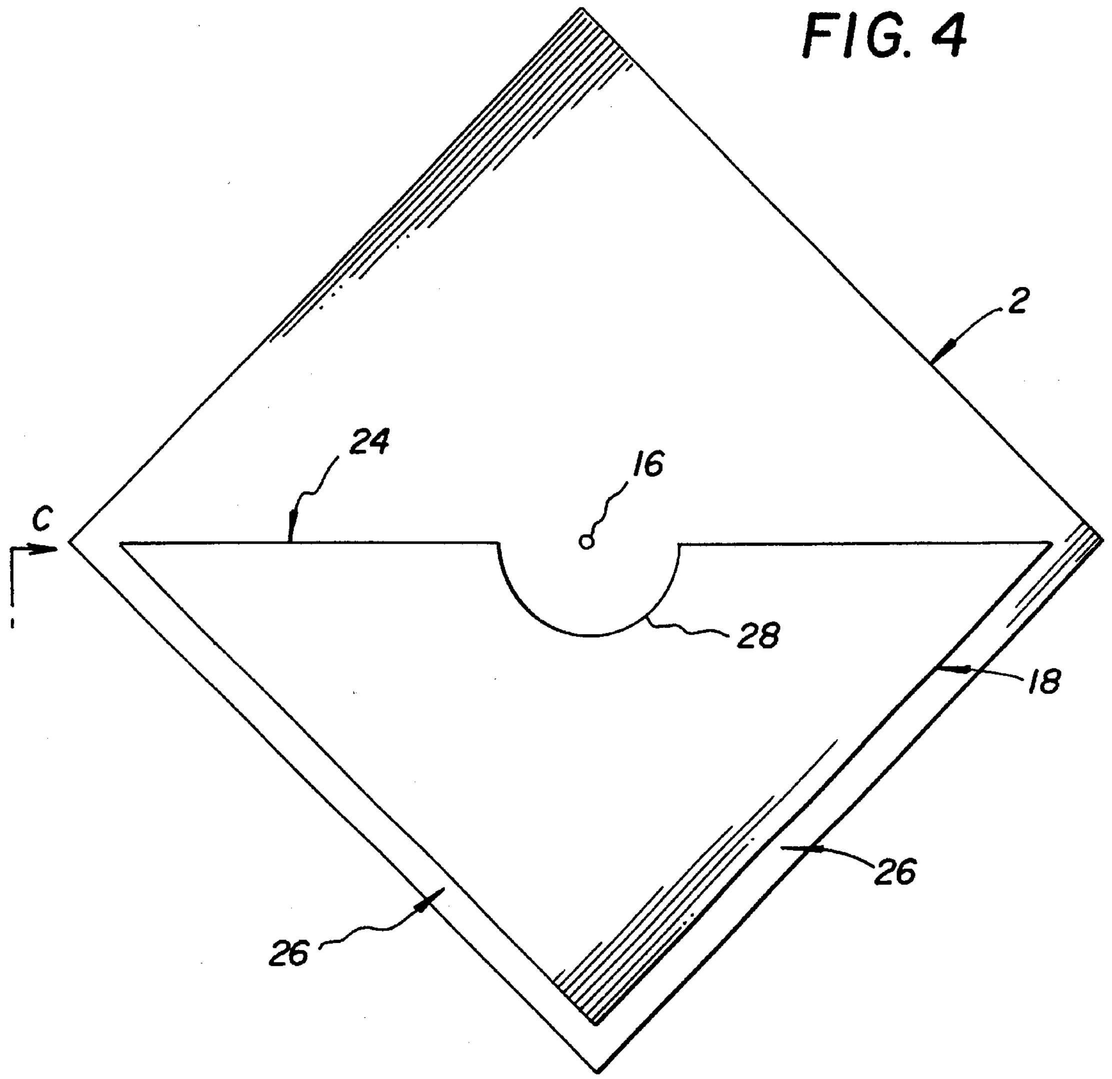
FIG. 4 is a top view of the bottom side of the unique multipurpose marking device of this invention.

FIG. 4 is a top view of the bottom side of the multipurpose device showing layer 2, layer 18, reveal spacing 26, semi circular cut-out section 28, hole 16 and edge 24 of triangular. By placing edge 24 against an edge of a board, a 45° angle is formed and the angle can then be marked for whatever purpose wanted.

Figure 5:
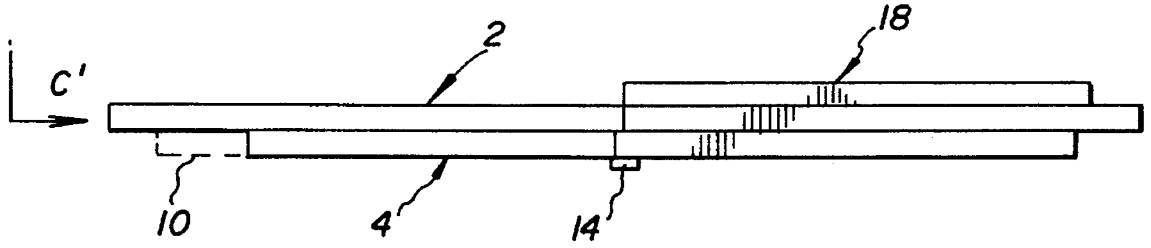
FIG. 5 is a side view of the unique multipurpose marking device of this invention.

FIG. 5 is a side view of the multipurpose device showing the three layers, namely layer 2, layer 6 and layer 18 with location knobs 14. The side view is taken in the direction of line A–A'.

Figure 6:
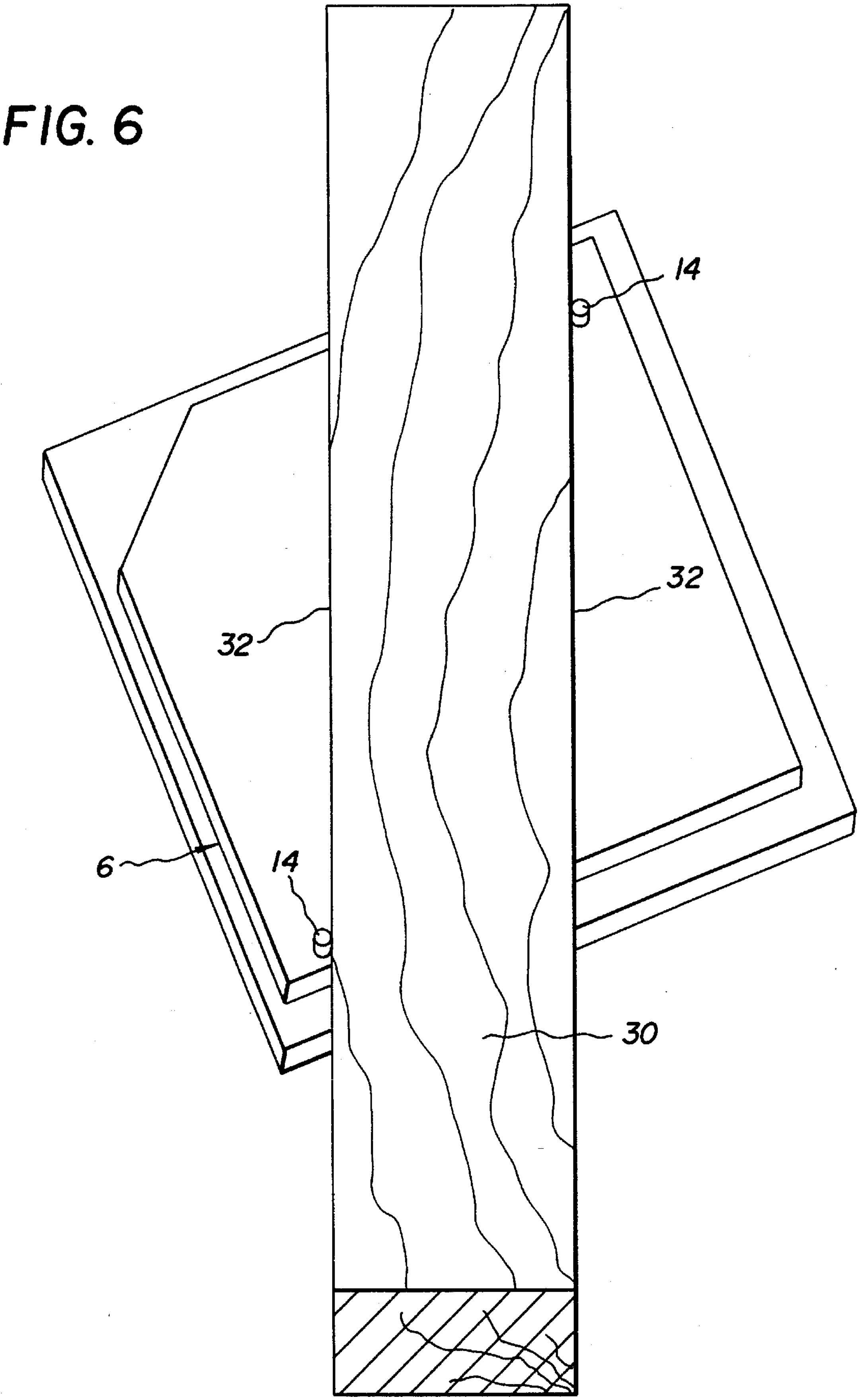
FIG. 6 is an isometric view from the bottom side of the placing of the multipurpose marking device against the flat surface of a board for finding the center of the board.

FIG. 6 is the underside of the placing of layer 6 of the device on a flat surface, namely board 30, in order to locate the center of board 30 between edges 32. Location knobs 14 are each separately placed one knob against one leading edge 32 of board 30 and the other knob 14 against the other leading edge 32 of board 30. By inserting a marking instrument such as a pencil through hole 16 (not shown but shown in FIGS. 1–4) from the opposite side, the center of board 30 can then be marked, i.e., the center between leading edges 32.

It is to be understood that while the drawings show a three layer laminated multipurpose device, the device of this invention may consist of one, two, three or more layers. For example, a two layer laminated device can consist of one layer composed of two of the layers shown in the drawing such as layer 2 and layer 4 of the drawing and the other layer laminated to it. The two layer composition can be molded such a injection molded or machined out of metal, wood, or even plastic. Alternatively, the device may be a single unit that is molded out of plastic or machined out of wood, metal or plastic. Also, the device of this invention whether it is a single mono-lithic unit or consists of a laminated device, can be made out of plastic, wood or metal.

Obviously, other modifications and variations of the invention are possible in light of the above disclosures. It is to be understood, however, that changes may be made in the particular embodiments of this invention so described herein which are within the full intended scope of the invention as defined by the appended claims.

What is claimed is:

1. A multipurpose device for marking the placing of a workpiece comprising in fixed relationship a composite of two planar outer sections and a planar middle section said planar sections being arranged in a substantially parallel relationship wherein the two outer planar sections in combination with the middle planar section provide means for setting a reveal between an edge of a substrate and an edge of a partially overlapping member, and wherein one said outer planar section is in the form of a triangle for forming and marking an angle from 10° to 90° on the workpiece, said other outer section being multi-edge and having means for determining the center of a solid flat surface between two parallel edges, and means for setting a space between two parallel members, wherein said middle planar section extends beyond at least one side of said two outer planar sections.

2. The multipurpose device of claim 1 wherein one outer planar section and the middle planar section are rectangular.

3. The multipurpose device of claim 1 wherein the device is a single mono-lithic unit.

4. The multipurpose device of claim 1 wherein the device consists essentially of a laminate.

5. The multipurpose device of claim 4 wherein the laminate consists essentially of three layers.

6. The device of claim 1 wherein said means for marking the center of a solid flat surface between two parallel edges consists essentially of at least two protrusion knobs and a hole through the device such that the two knobs and the hole are on a common center line.

7. The device of claim 6 wherein the rectangular outer planar section has three location knobs such that a center line through two of the knobs is parallel to one straight edge of the device such that when said two location knobs are placed against an edge of a work piece, a leading edge of the device perpendicular to said straight edge forms a right angle to the work piece.

* * * * *